US007116652B2

(12) United States Patent  (10) Patent No.: US 7,116,652 B2
Lozano  (45) Date of Patent: Oct. 3, 2006

(54) RATE CONTROL TECHNIQUE FOR LAYERED ARCHITECTURES WITH MULTIPLE TRANSMIT AND RECEIVE ANTENNAS

(75) Inventor: Angel Lozano, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 1006 days.

(21) Appl. No.: 09/999,442

(22) Filed: Oct. 18, 2001

(65) Prior Publication Data

US 2003/0076797 A1   Apr. 24, 2003

(51) Int. Cl.
    H04Q 7/00 (2006.01)
    H04H 1/00 (2006.01)
(52) U.S. Cl. .................................. 370/334; 370/339
(58) Field of Classification Search ............... 370/252, 370/465, 468, 328; 455/101; 375/299, 295, 375/377, 267
    See application file for complete search history.

(56) References Cited

U.S. PATENT DOCUMENTS

| 5,559,810 | A  | * | 9/1996 | Gilbert et al. ............... 714/704 |
| 6,760,882 | B1 | * | 7/2004 | Gesbert et al. ............. 714/774 |
| 6,873,606 | B1 | * | 3/2005 | Agrawal et al. ............ 370/310 |
| 6,930,981 | B1 | * | 8/2005 | Gopalakrishnan et al. .. 370/252 |
| 2002/0097686 | A1 | * | 7/2002 | Qiu ............................ 370/252 |
| 2002/0110101 | A1 | * | 8/2002 | Gopalakrishnan et al. .. 370/335 |

FOREIGN PATENT DOCUMENTS

WO   00 13362   3/2000

OTHER PUBLICATIONS

Kousa M,A. et al: "Adaptive Binary Coding For Diversity Communication Systems" IEEE International Conference On Personal wireless Communications Proceedings, 1997, pp. 80-84, XP000992269.
Poon, A.S.Y., et al: "An Adaptive Multi-Antenna Transceiver for Slowly Flat Fading Channels", Dept. of Electrical engineering and Computer Science, University of California, Mar. 2000, pp. 1-35, XP002179018.
Copy of European Search.
S. T. Chung et al., "Approaching Eigenmode BLAST Channel Capacity Using V-BLAST with Rate and Power Feedback", IEEE, Vehicular Technology Conference, Oct. 2001, pp. 915-919.
S. Shamai et al., "Spectral Efficiency of CDMA with Random Spreading", IEEE Transactions on Information Theory, vol. 45, Mar. 1999, pp. 622-640.
U.S. Appl. No. 09/714,084 entitled "Feedback Technique for Wireless Systems with Multiple Transmit and Receive Antennas", filed Nov. 16, 2000.

* cited by examiner

Primary Examiner—Ricky Q. Ngo
Assistant Examiner—Warner Wong
(74) Attorney, Agent, or Firm—Eugene J. Rosenthal

(57) ABSTRACT

In a wireless communication system using multiple antennas at the transmitter and multiple antennas at the receiver, with a sufficiently large number of antennas and/or diversity order, the same performance that is obtainable when employing instantaneous rate indication feedback can be attained without any such short-term feedback by adjusting the data rate of each transmit antenna according to a prescribed function. The prescribed function does not depend on the short-term state of the channel, but instead only depends on its long-term statistics, which may be fed back from the receiver to the transmitter at relatively lengthy intervals.

12 Claims, 2 Drawing Sheets

RATE CONTROL TECHNIQUE FOR LAYERED ARCHITECTURES WITH MULTIPLE TRANSMIT AND RECEIVE ANTENNAS

TECHNICAL FIELD

This invention relates to the art of wireless communications, and more particularly, to wireless communication systems using multiple antennas at the transmitter and multiple antennas at the receiver, so called multiple-input multiple-output (MIMO) systems.

BACKGROUND OF THE INVENTION

It is known in the art that multiple-input multiple-output (MIMO) systems can achieve dramatically improved capacity as compared to single antenna, i.e., single antenna to single antenna or multiple antenna to single antenna, systems. It is also known in the art that if information about the short-term state of the channel is fed back to the transmitter, then the throughput of the channel can be improved with respect to an identically configured system but without short-term feedback. However, because in MIMO systems the overall channel is actually made up of multiple channels, with one channel for each transmit antenna and receive antenna pairing, all of which are time-varying, such short-term feedback requires considerable bandwidth, and it is undesirable to dedicate so much bandwidth to feedback. Furthermore, each channel may span multiple coherence bandwidth intervals, where each coherence bandwidth interval is a swath of frequencies that experience the same effect due to the channel as they pass through the channel. The diversity order of a channel is the number of coherence bandwidth intervals spanned by the transmitted signal.

With some particular architectures, the amount of short-term feedback can be reduced with little loss in performance by replacing the information about the state of the channel with indications about the instantaneous data rate supported by each of the transmit antennas. See for example U.S. patent application Ser. No. 09/714,084. Nonetheless, there are instances in which even such feedback will be unacceptable, because it takes up to much of the available bandwidth of the reverse channel particularly when there is a large number of antennas.

SUMMARY OF THE INVENTION

In a MIMO system with a sufficiently large number of antennas and/or diversity order, the same performance that is obtainable when employing instantaneous rate indication feedback can be attained without any such short-term feedback, in accordance with the principles of the invention, by adjusting the data rate of each transmit antenna according to a prescribed function. In accordance with an aspect of the invention, such a function does not depend on the short-term state of the channel, but instead only depends on its long-term statistics, which may be fed back from the receiver to the transmitter at relatively lengthy intervals compared with the intervals required for short term feed back and requires considerably less bandwidth, e.g., 1,000 times less. Advantageously, the transmitter may employ only one-dimensional data coding for each of the transmit antennas.

DETAILED DESCRIPTION

Figure 1:
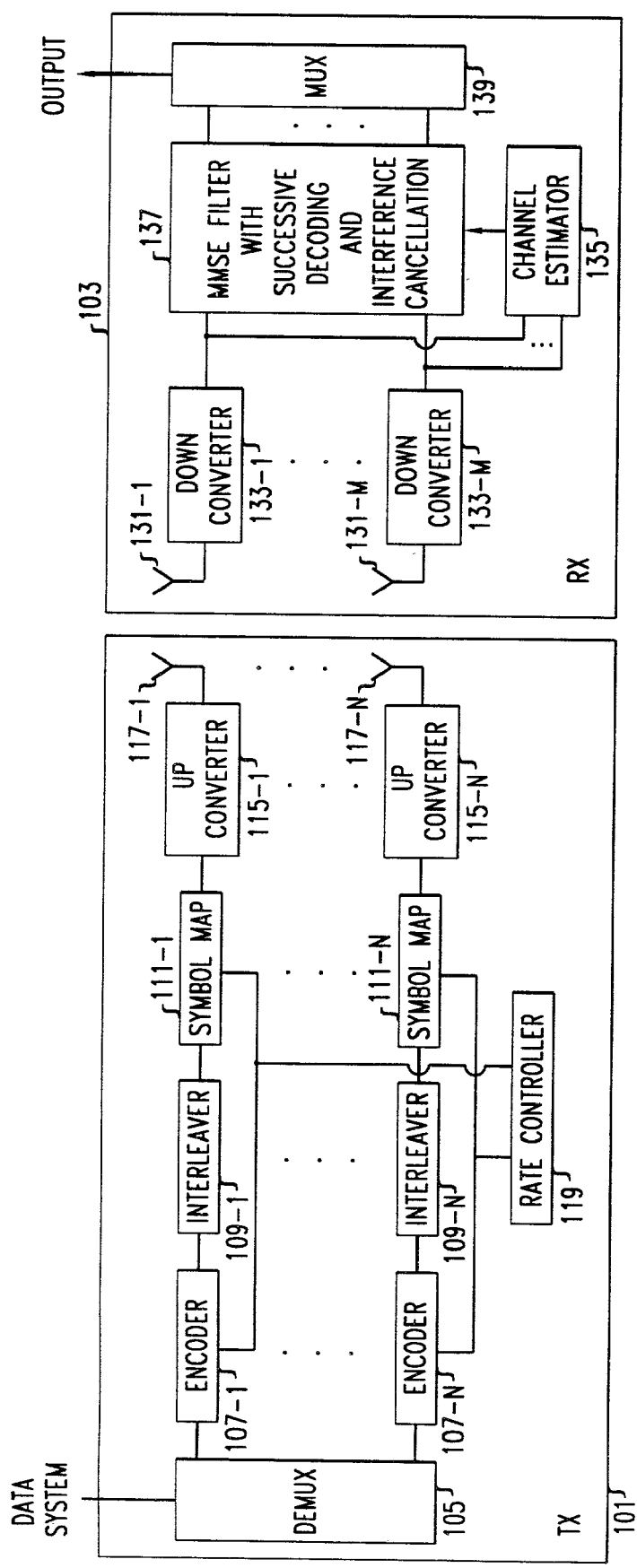
FIG. 1 shows an exemplary multiple-input multiple-output (MIMO) system arranged in accordance with the principles of the invention so as to achieve dramatically improved capacity as compared to single antenna systems.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

FIG. 1 shows an exemplary multiple-input multiple-output (MIMO) system arranged in accordance with the principles of the invention so as to achieve dramatically improved capacity as compared to single antenna systems. In particular, FIG. 1 shows transmitter (TX) 101 and receiver (RX) 103. Transmitter 101 includes a) demultiplexer (demux) 105; b) encoders 107, including encoders 107-1 through 107-N; c) interleavers 109, including interleavers 109-1 through 109-N; d) symbol mappers 111, including symbol mappers 111-1 through 111-N; e) optional upconverters 115, including optional upconverters 115-1 through 115-N; f) optional transmit antennas 117, including optional transmit antennas 117-1 through 117-N; and g) rate controller 119. Receiver 103 includes a) optional receive antennas 131, including optional receive antennas 131-1 through 131-M; b) optional downconverters 133, including optional downconverters 133-1 through 133-M; c) channel estimator 135; d) Mimimum-Mean Square Error (MMSE) filter with successive decoding and cancellation 137; and e) multiplexer (mux) 139.

Demultiplexer 105 receives as an input an original data stream, which is the data to be transmitted, and divides it into N data substreams, each to be processed along an independent transmit path and then transmitted.

Each of encoders 107 applies channel coding to the respective data substream it receives so as to increase the redundancy of the data substream. This facilitates error recovery at the receiver should errors occur. The type of channel coding used is a function of the rate as determined by the rate controller 119. The type of channel coding employed determines the particular amount of redundancy in the encoded data substream, and it is noted that the amount of redundancy is known as the code rate. Each of encoders 107 may use a channel coding that is independent of the channel coding used by any other of encoders 107, and each may receive an independently specified rate from the rate controller.

Interleavers 109 are conventional in nature and each rearranges the bits of the encoded data substream it receives to provide additional protection against errors.

Each of symbol mappers 111 maps the bits of the interleaved encoded channel substream that it receives to a point in a constellation. The particular constellation employed is selected as a function of the rate determined by the rate controller. Typically, the lower the rate of data transmission the lower the number of symbols in the constellation for transmitting data at that rate.

Each of optional upconverters 115 performs conventional upconverting functionality. In the case of a radio-based system each of upconverters 115 generates a radio frequency signal by modulating a carrier waveform using the gain regulated mapped data substream it receives as an input. Each resulting modulated signal may be supplied to the respective one of optional transmit antennas 117 that may be coupled to each of upconverters 115.

Rate controller 119 determines the code rate and the constellation size for each substream. Each code rate or an indicator thereof, is then supplied to the appropriate encoder and the constellation to employ, or an indicator thereof, is supplied to each symbol mapper.

Each of optional receive antennas 131 receives a signal from each of optional transmit antennas 117. The signals received at each antenna are converted to baseband by the one of optional downconverters 133 to which it is coupled. The resulting baseband signals each of which may be referred to as a receive branch, are fed into channel estimator 135 and MMSE filter with successive decoding and cancellation 137.

Channel estimator 135 develops an estimate of the channels for each transmit and receive pair. Thus, for N transmit antennas and M receive antennas there are M×N channels. The estimates for each of the channels are collectively arranged into an M×N matrix of the overall channel estimate $\hat{H}$. Additionally, channel estimator 135 develops an estimate of the noise power in the channel, $\hat{\sigma}^2$.

MMSE filter with successive decoding and cancellation 137 receives $\hat{H}$ and $\hat{\sigma}^2$ from channel estimator 135. Then, using well-established techniques, MMSE filter with successive decoding and cancellation 137 successively decodes each of the constituent substreams and then re-encodes, reconstructs, and cancels its interference contribution in order to facilitate the decoding of the remaining substreams. This process is fully set forth in "Approaching eigenmode BLAST channel capacity using V-BLAST with rate and power feedback", Vehicular Technology Conference (VTC'01 Fall), Atlantic City, N.J., October 2001 by S. T. Chung, A. Lozano and H. C. Huang, which is incorporated by reference as if fully set forth herein. The order with which the substreams are decoded is arbitrary, but known to the transmitter and, more specifically, to the rate controller 119 therein. Such order may be set by the implementor.

The decoded substreams are supplied by the MMSE filter with successive decoding and cancellation to multiplexer (mux) 139, which multiplexes them as in the original data stream.

Note that receiver 103 does not explicitly show a decoder and a deinterleaver, which are necessary so as to reverse the complementary functions performed in the transmitter, because these functions are part of the MMSE filter with successive decoding and cancellation. More specifically, each of the constituent substreams is therein deinterleaved, by a corresponding deinterleaver, and then decoded by a corresponding decoder. The output of each decoder is supplied to multiplexer 139 and also re-encoded and used within MMSE filter with successive decoding and cancellation 137 for interference cancellation.

It was shown by S. T. Chung, A. Lozano and H. C. Huang in "Approaching eigenmode BLAST channel capacity using V-BLAST with rate and power feedback", Vehicular Technology Conference (VTC'01 Fall), Atlantic City, N.J., October 2001, that the transmitter and receiver architectures described therein can approach the capacity of the channel if the rate of each transmit antenna is optimally adjusted. Such optimality, however, comes typically at the expense of requiring short-term feedback. Furthermore, this optimality is maintained regardless of the particular decoding order employed. However, it should be noted that although the rate of each individual antenna depends on the decoding order, the aggregate rate does not. Thus, regardless of the decoding order employed, the same aggregate rate is attained. Hence, it may be taken, without loss of generality, that the antennas are decoded in accordance with their index n.

It has been shown in U.S. patent application Ser. No. 09/714,084 that the optimal rate for antenna n is given by $$R_n = \log_2\left(1 + h_n^H\left(H_n H_n^H + \frac{N\sigma^2}{P}I\right)^{-1} h_n\right) \quad (1)$$

where $h_n = [h_{1,n} \ldots h_{M,n}]^T$ is the complex M-dimensional channel vector for transmit antenna n, with $h_{m,n}$ being the channel transfer coefficient between transmit antenna n and receive antenna m;

$X^T$ indicates the matrix transpose operation for matrix X;

$H_n = [h_{n+1} \ h_{n+2} \ \ldots \ h_N]$, an M-by-(N-n) matrix;

P represents the total radiated power;

$X^H$ indicates the Hermitian transpose operation for matrix X;

I the M-by-M identity matrix; and $\sigma^2$ is the noise variance.

These optimal rates are fed back on a short-term basis to the transmitter in U.S. patent application Ser. No. 09/714,084. Eq. (1) can be rewritten as $$R_n = \log_2\left(I + \frac{P}{N\sigma^2} H_{n-1} H_{n-1}^H\right) - \log_2\left(I + \frac{P}{N\sigma^2} H_n H_n^H\right) \quad (2)$$

which indicates that the rate supported by the n-th transmit antenna is given by the difference between the aggregate rate of transmit antennas n to N and the aggregate rate of transmit antennas n+1 to N.

As the number of antennas increases, the capacity hardens, i.e., its short-term randomness vanishes. This can be seen from the matrix analysis taught by S. Verdu and S. Shamai, in "Spectral efficiency of CDMA with random spreading", IEEE Transactions on Information Theory, Vol. 45, March 1999, pp. 622–640, which is incorporated by reference as if fully set forth herein. Mathematically, this hardening process stems from the so-called "almost-sure" convergence of the singular values of $H = [h_1 \ h_2 \ \ldots \ h_N]$. Defining the ratio of transmit and receive antennas as $$\beta = \frac{N}{M}$$

and the capacity per receive antenna as $$C = \frac{C}{M}$$

with C being the total capacity, then, as the number of antennas, i.e., either M, N or both M and N, is driven to infinity, C converges to a function that is deterministic in the short-term, that is, the function depends only on long-term parameters such as the signal-to-noise ratio and fixed parameters such as $\beta$, i.e., $$C \to f(\beta, \text{long-term parameters})$$

Furthermore, in accordance with an aspect of the invention, we have recognized that although such a function is actually asymptotic, it yields an extremely accurate approximation of the short-term average capacity even when the number of antennas is finite, and even a small finite number, e.g., 4 antennas.

Defining a normalized version of the decoding index, which is the index of the transmit antennas divided by the total number of receive antennas, i.e., $$b = \frac{n}{M}$$

then, as the number of antennas is driven to infinity, b becomes a continuous function between 0 and $\beta$ and the difference in Eq. (2) converges in the limit to a derivative. The set of optimal rates, i.e., as computed from Eq. (1), becomes, in the limit, i.e., as the number of antennas becomes infinite, a continuous rate distribution function. This continuous rate distribution function can be expressed as $$R(b) = \frac{d}{dx}C(x, \text{long-term parameters})\Big|_{x=\beta-b} \quad (3)$$

which, again, yields an extremely accurate approximation of the short-term average of the rates given by Eq. (1). Note that the capacity per receive antenna C is the integral of the rates R(b) as b goes from 0 to $\beta$.

Thus, the set of rates to be employed is given by the derivative of the asymptotic capacity. Therefore, in accordance with the principles of the invention, rate controller 119 adjusts the rates of the various transmit antennas according to Eq. (3), the computation of which requires the use of only long-term parameters. Advantageously, having rate controller 119 use such a rate distribution yields quasi-optimal performance, without requiring any short-term feedback, so long as the number of antennas and/or the diversity order is sufficiently large.

Further note that the capacity that is available depends on the type of noise present on the channel. Thus, for example, in the presence of additive white Gaussian noise (AWGN), which is the most common type of noise, the asymptotic capacity per receive antenna is given by $$C(\beta, SNR) = \log_2(1 + SNR - \mathcal{F}) + \beta \log_2\left(1 + \frac{SNR}{\beta} - \mathcal{F}\right) - \beta \frac{\log_2 e}{SNR}\mathcal{F} \quad (4)$$

where $$\mathcal{F} = \frac{1}{4}\left(\sqrt{1 + \frac{SNR}{\beta}(1+\sqrt{\beta})^2} - \sqrt{1 + \frac{SNR}{\beta}(1-\sqrt{\beta})^2}\right)^2$$

SNR is the long-term average signal-to-noise ratio per receive antenna (SNR) given by $$SNR = \frac{P \cdot g}{\sigma^2},$$

where P is the total transmit power and g is the variance of the entries of H. Note that the SNR may be obtained by determining it either at the transmitter itself, e.g., employing the SNR of the reverse channel, or by having it periodically fed back from the receiver, at which it is determined. Note that feeding back of the SNR from the receiver is not shown in FIG. 1 to avoid confusion with prior art feed back arrangements which had to feed back short term parameters quite frequently. By contrast, the SNR is a long term parameter that would need to be fed back relatively infrequently.

Thus, for AWGN, in accordance with an aspect of the invention, the asymptotic capacity is solely a function of the SNR and β, and the derivative of the asymptotic capacity, Eq. (4) can be calculated to yield $$R(b) = \log_2\left(1 + \frac{SNR}{\beta} - \frac{1}{4}\left[\sqrt{1 + \frac{SNR}{\beta}(1 + \sqrt{\beta - b})^2} - \sqrt{1 + \frac{SNR}{\beta}(1 - \sqrt{\beta - b})^2}\right]^2\right) \quad (5)$$

Figure 2:
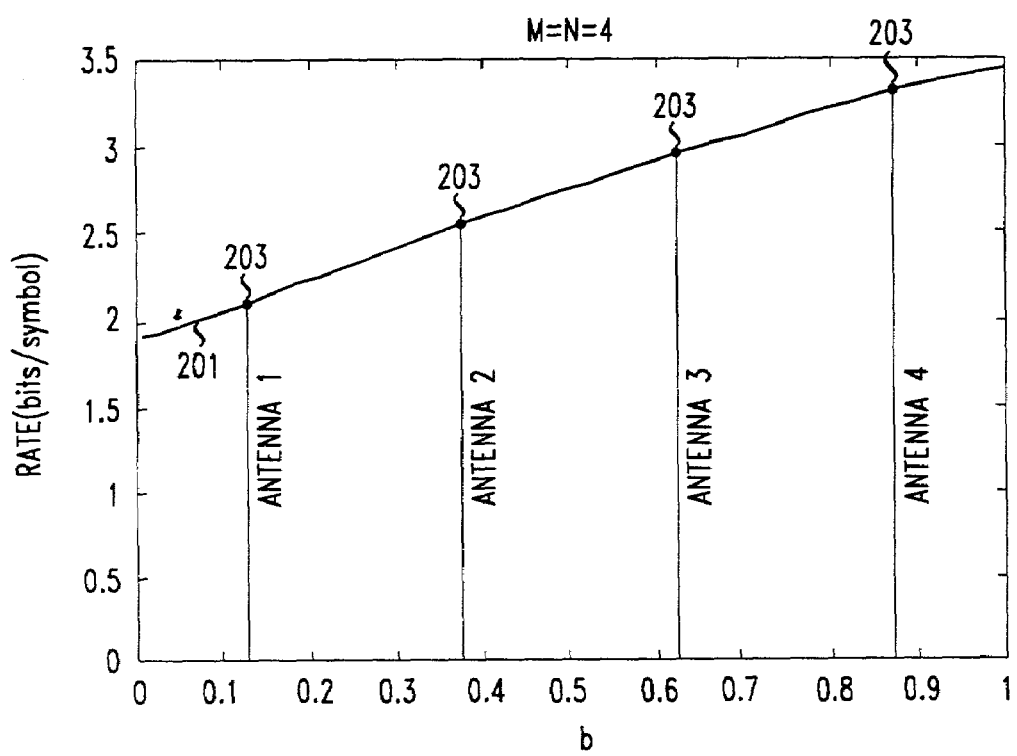
FIG. 2 shows an exemplary distribution of transmit data rates for a particular set of long-term conditions in accordance with an aspect of the invention.

FIG. 2, shows an exemplary distribution, for an architecture with β=1 and with the long-term SNR parameter set to 10 dB for the distribution given in Eq. (5). Overlaid on curve 201 corresponding to Eq. (5), which is for an infinite number of antennas, are dots 203 that indicate the short-term average of the optimal rates in Eq. (1) for the case of 4 transmit and 4 receive antennas at the same long-term SNR. The dots have been positioned on the b axis to be in the middle of the steps when the entire range from 0 to β is divided by the number of transmit antennas N, i.e., the dot for each antenna n is located at $$\frac{n - 0.5}{M}.$$

In FIG. 2, because the short-term average is employed, it is as if there is diversity order of infinity.

Note that wherever a signal that originates at a receive antenna is referred to, in systems without antennas a receive branch may be referred to. Similarly, the number of antennas may be substituted by the number of receive branches.

What is claimed is:

1. A transmitter of a multiple-input multiple-output (MIMO) system for transmitting a plurality of data substreams derived from a data stream, comprising:
   means for obtaining a long term parameter; and
   a rate controller that develops a rate for each transmit data substream as function of at least said long term parameter and no short term parameters;
   wherein said transmitter is a wireless transmitter and each of said substreams is transmitted by a separate antenna over a channel to a receiver having a plurality of receive antennas, and wherein said rate controller develops each rate for each of said transmit data substream using a derivative of asymptotic capacity of said system.

2. The invention as defined in claim 1 wherein said long term parameter is a signal-to-noise ratio (SNR).

3. The invention as defined in claim 1 wherein said long term parameter is supplied by said receiver coupled via a channel to said transmitter.

4. The invention as defined in claim 1 wherein said long term parameter is developed at said transmitter.

5. The invention as defined in claim 1 wherein said long term parameter is characteristic of a channel between said transmitter and said receiver.

6. The invention as defined in claim 1 wherein said rate controller determines an approximation of the optimal rate for each transmit data substream.

7. A transmitter of a multiple-input multiple-output (MIMO) system for transmitting a plurality of data substreams derived from a data stream, comprising
   means for obtaining a long term parameter; and
   a rate controller that develops a rate for each transmit data substream as function of at least said long term parameter and no short term parameters;
   wherein said rate controller determines an approximation of the optimal rate for each transmit data substream and said optimal rate for each transmit data substream is given by $$R_n = \log_2\left(1 + h_n^H\left(H_n H_n^H + \frac{N\sigma^2}{P}I\right)^{-1} h_n\right)$$

where n is a data substream index;

$h_n = [h_{1,n} \ldots h_{M,n}]^T$ is the complex M-dimensional channel vector for transmit substream, with $h_{m,n}$ being the channel transfer coefficient between transmit substream n and receiver branch m;

$X^T$ indicates the matrix transpose operation for matrix X;

$H_n = [h_{n+1}\ h_{n+2} \ldots h_N]$, an M-by-(N-n) matrix;

P represents the total radiated power;

$X^H$ indicates the Hermitian transpose operation for matrix X;

I the M-by-M identity matrix; and $\sigma^2$ is the noise variance.

8. The invention as defined in claim 1 wherein said rate controller determines said rate for each transmit data substream also as a function of fixed parameters.

9. The invention as defined in claim 1 wherein said rate controller determines said rate for each transmit antenna also as a function of the ratio of transmit data substreams and receive antennas β, where $$\beta = \frac{N}{M},$$

N is the number transmit antennas and M is the number of receive antennas.

10. A transmitter of a multiple-input multiple-output (MIMO) system for transmitting a plurality of data substreams derived from a data stream, comprising:
    means for obtaining a long term parameter; and
    a rate controller that develops a rate for each transmit data substream as function of at least said long term parameter and no short term parameters;
    wherein said data substreams are transmitted via a channel impaired by additive white Gaussian noise (AWGN), and said rate controller determines said rates by computing $$R(b) = \log_2\left(1 + \frac{SNR}{\beta} - \frac{1}{4}\left[\sqrt{1 + \frac{SNR}{\beta}(1+\sqrt{\beta-b})^2} - \sqrt{1 + \frac{SNR}{\beta}(1-\sqrt{\beta-b})^2}\right]^2\right)$$

where $\beta = \frac{N}{M}$,

N is the number transmit data substreams,
M is the number of receive branches,
SNR is the long-term average signal-to-noise ratio, and
h is n/M, where n is the index of the transmit data substreams.

11. A wireless transmitter of a multiple-input multiple-output (MIMO) system for transmitting wirelessly a plurality of data substreams derived from a data stream, each of said data substreams being transmitted via an antenna of said wireless transmitter, said data substreams being for receipt at a receiver having a plurality of receive antennas, said transmitter comprising means for obtaining a long term parameter; and
a rate controller that develops a rate for each transmit data substream as function of at least said long term parameter and no short term parameters;
said data substreams being transmitted via a channel impaired by additive white Gaussian noise (AWGN), and said rate controller determines said rates by computing $$R(b) = \log_2\left(1 + \frac{SNR}{\beta} - \frac{1}{4}\left[\sqrt{1 + \frac{SNR}{\beta}(1+\sqrt{\beta-b})^2} - \sqrt{1 + \frac{SNR}{\beta}(1-\sqrt{\beta-b})^2}\right]^2\right)$$

where $\beta = \frac{N}{M}$,

N is the number transmit antennas,
M is the number of receive antennas,
SNR is the long-term average signal-to-noise ratio, and
h is n/M, where n is the index of the transmit antennas.

12. A method for use in transmitter of a multiple-input multiple-output (MIMO) system that is transmitting a plurality of data substreams derived from a data stream, the method comprising the steps of:

obtaining a long term parameter; and
determining a rate for each transmit data substream as function of at least said long term parameter and no short term parameters;
wherein said data substreams are transmitted via a channel impaired by additive white Gaussian noise (AWGN), and said rate controller determines said rates by computing $$R(b) = \log_2\left(1 + \frac{SNR}{\beta} - \frac{1}{4}\left[\sqrt{1 + \frac{SNR}{\beta}(1+\sqrt{\beta-b})^2} - \sqrt{1 + \frac{SNR}{\beta}(1-\sqrt{\beta-b})^2}\right]^2\right)$$

where $\beta = \frac{N}{M}$,

N is the number transmit data substreams,
M is the number of receive branches,
SNR is the long-term average signal-to-noise ratio, and
h is n/M, where n is the index of the transmit data substreams.

* * * * *